(12) United States Patent
Chung et al.

(10) Patent No.: US 7,220,063 B2
(45) Date of Patent: May 22, 2007

(54) OPTICAL TRANSCEIVER MODULE

(75) Inventors: Ming-Hsing Chung, Taoyuan Hsien (TW); Chang-Hung Tien, Taoyuan Hsien (TW); San-Ching Kuo, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 11/357,067

(22) Filed: Feb. 21, 2006

(65) Prior Publication Data

US 2006/0222303 A1   Oct. 5, 2006

(30) Foreign Application Priority Data

Apr. 1, 2005   (TW) ................ 94110424 A (51) Int. Cl.
*G02B 6/36* (2006.01)
*H04B 10/00* (2006.01)

(52) U.S. Cl. .................. 385/88; 385/92; 385/89; 398/135; 398/139

(58) Field of Classification Search .......... 385/88, 385/89, 92, 93, 94, 49, 14; 398/135, 139
See application file for complete search history.

(56) References Cited

U.S. PATENT DOCUMENTS

| | | | | |
|---|---|---|---|---|
| 6,832,858 | B2* | 12/2004 | Roth et al. | 385/71 |
| 2002/0126356 | A1* | 9/2002 | Nakanishi et al. | 359/163 |
| 2003/0081907 | A1* | 5/2003 | Malagrino et al. | 385/73 |
| 2003/0152331 | A1* | 8/2003 | Dair et al. | 385/59 |
| 2005/0175294 | A1* | 8/2005 | Kuu | 385/88 |
| 2006/0222303 | A1* | 10/2006 | Chung et al. | 385/88 |

* cited by examiner

*Primary Examiner*—Brian M. Healy
(74) *Attorney, Agent, or Firm*—Birch, Stewart, Kolasch & Birch, LLP (57) ABSTRACT

An optical transceiver module comprises a circuit structure, an optical fiber, a fixture, an optical transceiver and a cover. The optical fiber transmits optical signal. The fixture partially or completely covers the optical fiber, wherein optical signals are transmitted in the optical fiber. The optical transceiver is coupled to the fixture and connected to the circuit structure, and is for receiving/transmitting the optical signals. The cover is connecting one end of the optical fiber to the optical transceiver.

18 Claims, 7 Drawing Sheets

OPTICAL TRANSCEIVER MODULE

This Non-provisional Application claims priority under U.S.C.§ 119(a) on Patent Application No(s). 094110424, filed in Taiwan, Republic of China on Apr. 1, 2005, the entire contents of which are hereby incorporated by reference.

BACKGROUND

The invention relates to an optical transceiver module, and in particular to an optical transceiver module with simplified manufacturing process, and easier assembly and low cost.

Figure 1:
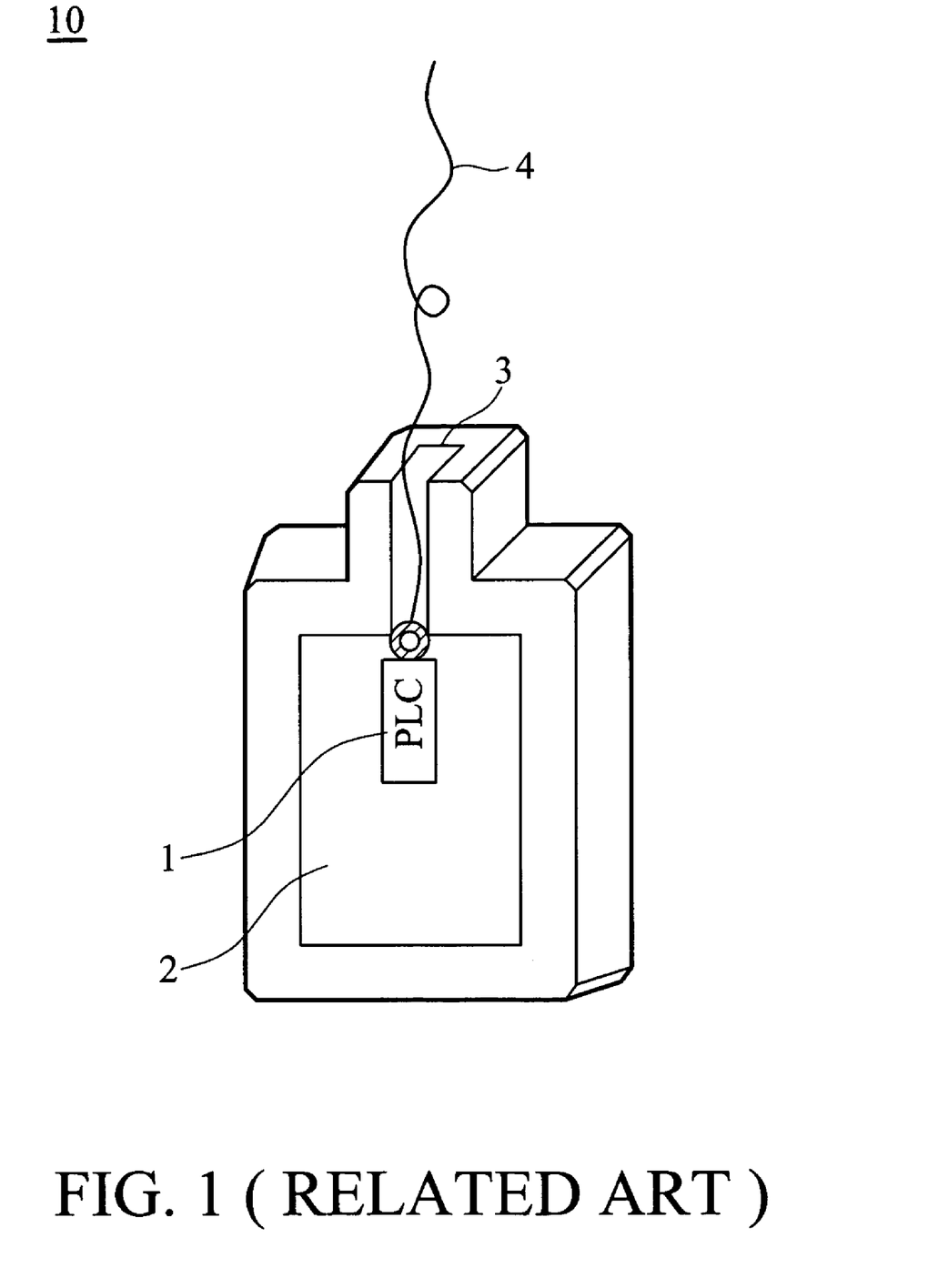
FIG. 1 is a schematic view of a conventional optical receiver/transmitter module.

In FIG. 1, a conventional optical receiver/transmitter module 10 includes a planar light wave circuit (PLC) 1, a ceramic plate 2 having an opening 3 and an optical fiber 4. The PLC 1, disposed on the ceramic plate 2, has an incident light inlet corresponding to the opening 3 of the ceramic plate 2. The optical fiber 4 is inserted into the opening 3 of the ceramic plate 2 is and is fixed at the incident light inlet of the PLC 1. Thus, assembly of the optical receiver/transmitter module 10 is completed after the ceramic plate 2 is fixed on a printed circuit board (PCB) via leads. However, it is necessary to use the ceramic plate 2 for the described optical receiver/transmitter module 10, and thus the manufacturing cost is high.

Figure 2:
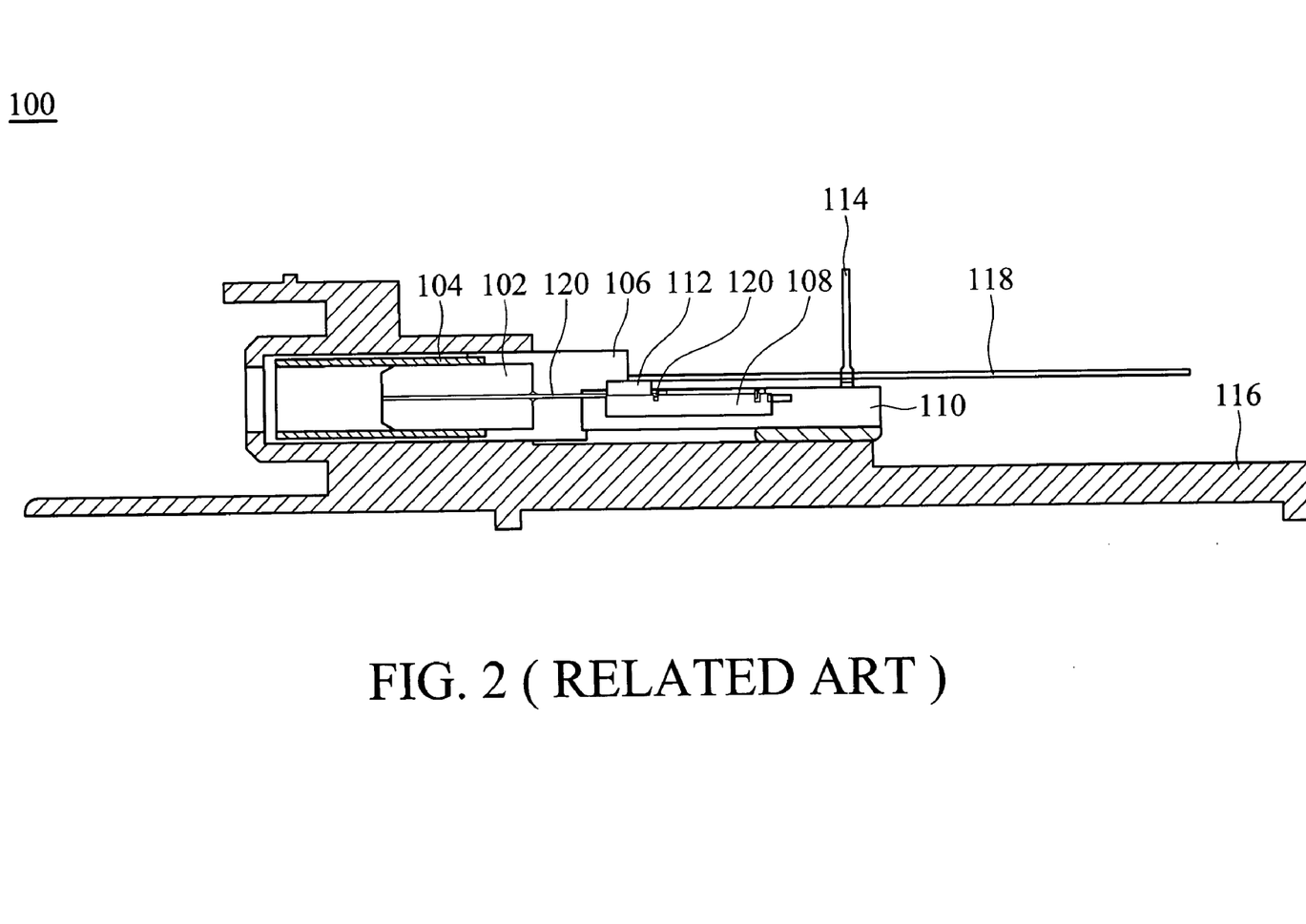
FIG. 2 is a schematic sectional view showing another conventional optical receiver/transmitter module.

In FIG. 2, a conventional optical receiver/transmitter module 100 includes an optical fiber 102 having a core 120, a ferrule 104 made of Zirconium Oxide, a flange 106 made of free cutting copper, a PLC 108, a ceramic plate 110, a fiber cover 112, a plurality of legs 114, a base plate 116, and a PCB 118 having a V-shaped slot. The optical fiber 102 passes through the ferrule 104, and the ferrule 104 is coupled to the flange 106. The PLC 108 is fixed to the ceramic plate 110. The core 120 of the optical fiber 102 placed on the V-shaped slot of the PCB 118 corresponds to a waveguide incident surface of the PLC 108. The fiber cover 112, placed on the core 120 of the optical fiber 102, is thermally fixed to the PLC 108. The PLC 108 is electrically connected to the ceramic plate 110 by wiring. The ceramic plate 110 and the flange 106 are adhesively coupled to the base plate 116, to position the optical fiber 102 and the PLC 108 and prepare for the next connection. Thus, the optical receiver/transmitter module 100 can be completed after the legs 114 extending from the ceramic plate 110 are electrically connected to the PCB 118.

Although the utility amount of ceramic material can be reduced in the described optical receiver/transmitter module 100, it is still necessary to use the ferrule 104, the flange 106 and the ceramic plate 110 so that the corresponding manufacturing costs cannot be reduced. Further, the optical receiver/transmitter module 100 requires at least three steps more than the optical receiver/transmitter module 10, which increases the time and complexity of the manufacturing process.

SUMMARY

The invention provides an optical transceiver module without using high-temperature resistant material to connect the optical fiber to the optical transceiver, whereby simplifying the manufacturing process and reducing production costs.

A main feature of the optical transceiver module of the invention is that the optical fiber of the optical transceiver module is enclosed by flexible or soft material, to absorb vibration and pressure on the optical fiber and to prevent shifting, deformation and cracking of the optical fiber.

The optical transceiver module includes a circuit structure, a fixture having a recess, an optical transceiver and a cover. The circuit structure is embedded in the recess of the fixture. The circuit structure is connected to the recess by adhesive material, resilient material, stuffing material, flexible material or soft material. The fixture encloses or partially or completely covers the optical fiber, wherein optical signals are transmitted in the optical fiber. The fixture is connected to the optical fiber by adhesive material, resilient material, stuffing material, flexible material, or other soft materials, to prevent shifting, deformation and cracking of the optical fiber.

The invention further provides an optical transceiver module including a circuit structure, a fixture partially or completely covering the optical fiber, an optical transceiver coupled to the fixture and connected to the circuit structure for receiving/transmitting the optical signal, a housing having an opening for fixing the optical fiber therein, and a cover connecting one end of the optical fiber to the optical transceiver. The optical signals are transmitted in the optical fiber.

The optical fiber of the optical transceiver module of the invention is enclosed by flexible or soft material, to absorb vibration and pressure on the optical fiber and to prevent shifting, deformation and cracking of the optical fiber. The optical transceiver is directly connected to the circuit structure and receiving/transmitting the optical signals via the optical fiber. The cover connects the optical fiber with the optical transceiver by glue adhesion, dot welding, or laser welding.

The optical transceiver and the cover are disposed on one side of the circuit structure, and the optical transceiver is set between the cover and the circuit structure. The optical fiber is connected to the optical transceiver to form an electrical connection. The circuit structure includes at least one pin connected to an external system to form an electric connection.

The optical transceiver is a planar light guide, a laser diode, a vertical cavity surface emitting laser, a light emitting diode or a photodiode. The cover is made of plastics, metal, alloy, stainless steel or ceramics.

The optical transceiver is directly connected to the circuit structure, i.e., using the circuit structure as a carrier instead of using the ceramic plate to connect to the circuit board of the related art so as to simplify the assembling process and to reduce manufacturing cost and time.

Additionally, instead of using thermal bonding to connect the optical fiber to the optical transceiver and using the high-temperature ring to position the optical fiber, the bonding material between the optical fiber and the optical transceiver of the invention do not require application of the high-temperature resistant material, so as to simplify the manufacturing process and reduce production costs.

The invention uses different methods of glue adhesion, instead of the ceramic base plate, to connect the cover to the optical transceiver. The gluing material can be a cold Epoxy resin or other cold resins, so as to reduce thermal deformation of material. Preferably, the fixture can be made of cold metal.

Additionally, instead of using thermal bonding to connect the optical fiber to the optical transceiver and using the high-temperature ring to position the optical fiber, the bonding material between the optical fiber and the optical transceiver of the invention do not require application of the high-temperature resistant material.

Additionally, the optical fiber of the optical transceiver module of the invention is enclosed by flexible or soft material, so as to absorb vibration and pressure on the optical fiber and to prevent shifting, deformation and cracking of the optical fiber.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the subsequent detailed description and the accompanying drawings, which are given by way of illustration only, and thus are not limitalive of the present invention, and wherein.

DETAILED DESCRIPTION

Figure 3A:
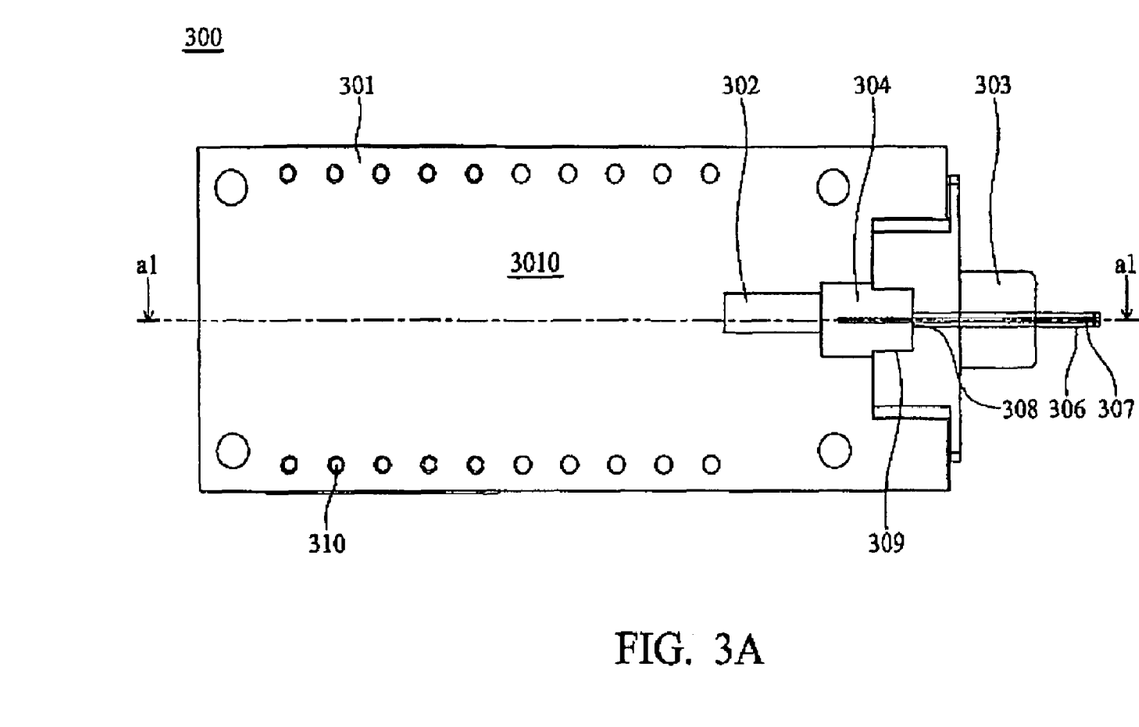
FIG. 3A is a top view of an optical transceiver module of the first embodiment of the invention.
Figure 3B:
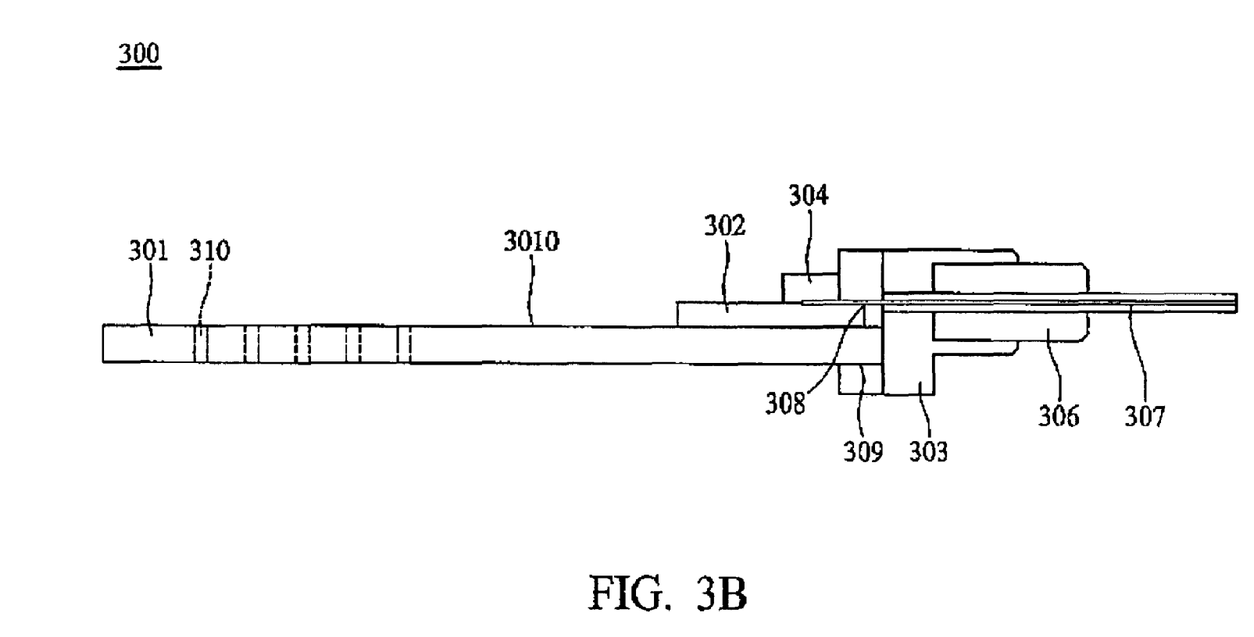
FIG. 3B is a schematic sectional view of the optical transceiver module along line (a1—a1) of FIG. 3A.

In FIGS. 3A and 3B, an optical transceiver module 300 of the first embodiment of the invention includes a circuit structure 301 having an outer surface 3010, an optical transceiver 302 having an opening 308, a fixture 303 positioned to the opening 308 of the optical transceiver 302 and having a recess 309, a cover 304 and an optical fiber 306. The conjunction between the optical transceiver 302 and the fixture 303 is covered by the cover 304, and the edge of the cover 304 disposed within the outer surface 3010 is fixed securely to the optical transceiver 302 by glue adhesion (e.g. UV glue, cold Epoxy resin or other cold resins), dot welding and laser welding. The cover 304 is preferably made of plastic, metal, alloy, stainless steel, ceramics or other rigid materials.

In the first embodiment, the optical transceiver 302 can be a planar light guide, a laser diode (LD), a vertical cavity surface emitting laser (VCSEL), a light emitting diode (LED) or a photodiode (PD), for receiving/transmitting the optical signals via the core 307 of the optical fiber 306.

The optical fiber 306 is partially covered by the fixture 303 and has a core 307 with a totally reflective internal structure, e.g., solid or hollow totally reflective internal structure so as to conduct movement of the optical signal along a desired path. The optical fiber 306 passing through the fixture 303 extends outwardly from the fixture 303. The fixture 303 and the optical fiber 306 are assembled by adhesive material, resilient material, stuffing material, flexible or soft material, so as to absorb vibration and pressure on the optical fiber 306 and prevent shifting of the optical fiber 306.

The circuit structure 301 is embedded in the recess 309 of the fixture 303. A connecting material such as adhesive material, resilient material, stuffing material, flexible material or soft material is applied between the circuit structure 301 and the recess 309 of the fixture 303, so as to stabilize the connection between the circuit structure 301 and the fixture 303.

In this embodiment, the circuit structure 301 is preferably a printed circuit board. The circuit structure 301, controlling or controlled by the optical transceiver 302, has a plurality of pins 310 connected to an external system (not shown) to form an electrical connection. The optical transceiver 302 directly connected to the circuit structure 301 can receive and convert the optical signal into an electrical signal or other formatted signals, and the optical transceiver 302 can receive and convert the electrical signal and other formatted signals into an optical signal. The optical transceiver 302 is preferably connected to the circuit structure 301 by wire bonding or embedding, or the optical transceiver 302 and the circuit structure 301 can be integrally formed or assembled into one unit.

In FIG. 3B, the optical transceiver 302 and the cover 304 are disposed on one side of the circuit structure 301, and the optical transceiver 302 is set between the cover 304 and the circuit structure 301.

Figure 4:
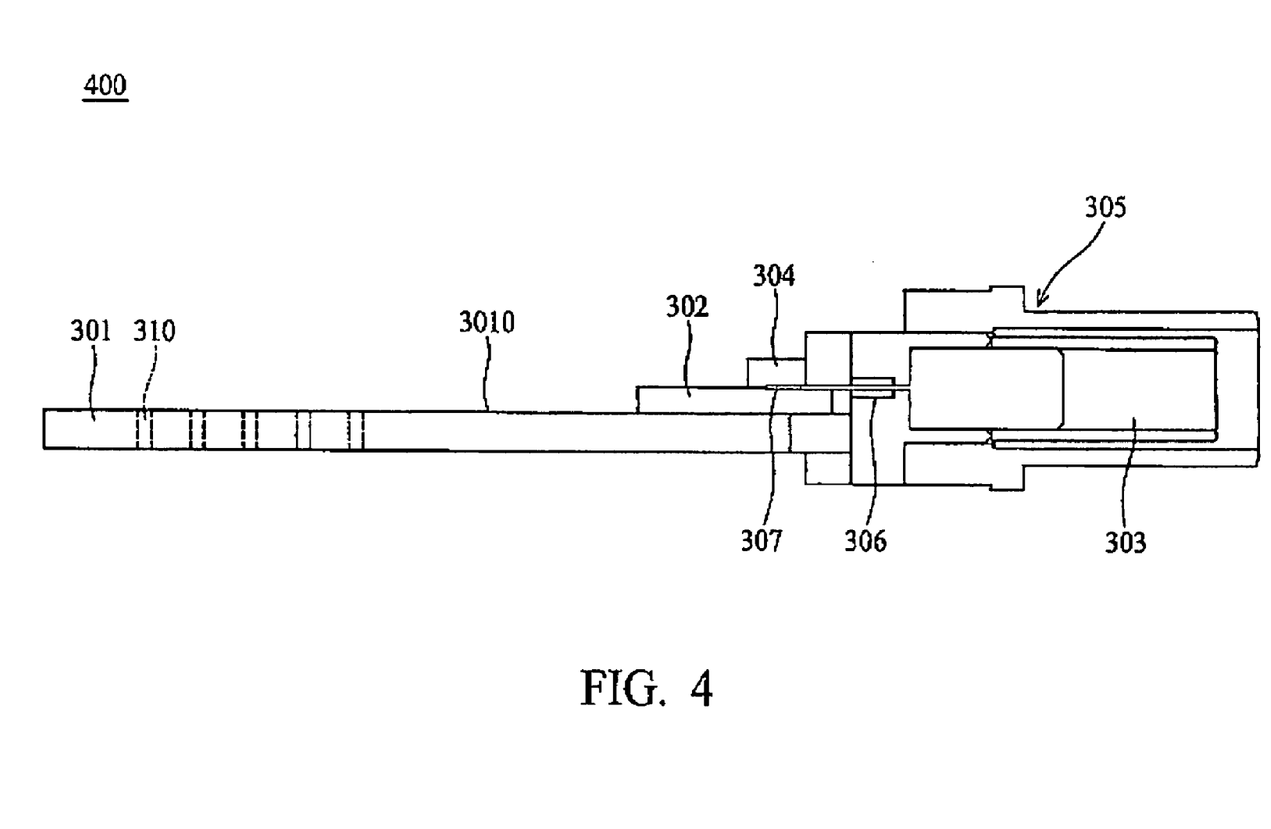
FIG. 4 is a schematic view of an optical transceiver module of the second embodiment of the invention.

FIG. 4 shows an optical transceiver module 400 of the second embodiment of the invention. The second embodiment differs from the optical transceiver module 300 of the first embodiment in that the optical transceiver module 400 further includes a cap 305 to enclose the fixture 303 so that the circuit structure 301 is embedded in the fixture 303 by the cap 305. Preferably, the cap 305 and the fixture 303 can be integrally formed or assembled into one unit. The cap 305 is preferably made of plastics, metal, alloy, stainless steel, ceramics, or other rigid materials. The cap 305 can be connected to the fixture 303 by adhesion, engaging, embedding, fitting or clamping.

The optical transceiver 302 is electrically connected to the circuit structure 301 by wire bonding. The fixture 303 and the cap 305 can be relatively positioned by engaging, embedding, welding, clamping or adhering. When the fixture 303 encloses the optical fiber 306, a flexible or stuffing material can be disposed between the optical fiber 306 and the fixture 303, to fix securely the optical fiber 306 disposed in the fixture 303.

The circuit structure 301 is embedded in the recess 309 of the fixture 303, and the core 307 of the optical fiber 306 is disposed in the opening 308 of the optical transceiver 302, so that the core 307 contacts an input port and output port (not shown). The cover 304 covering the opening 308 is fixed securely to the optical transceiver 302 by glue adhesion, dot welding or laser welding so that the optical fiber 306 is fixedly clamped between the cover 304 and the optical transceiver 302.

In the described embodiments, allocation and alignment between the fixture and the optical transceiver can be rapidly accomplished, and the combination of the fixture and the optical transceiver does not require a high-temperature melting process. Specifically, some components of the described optical transceiver modules can be made of low cost plastics, whereby reducing costs and simplifying the manufacturing process. Further, it is to be understood that the invention is not limited to the disclosed embodiments of the assembly method.

Figure 5A:
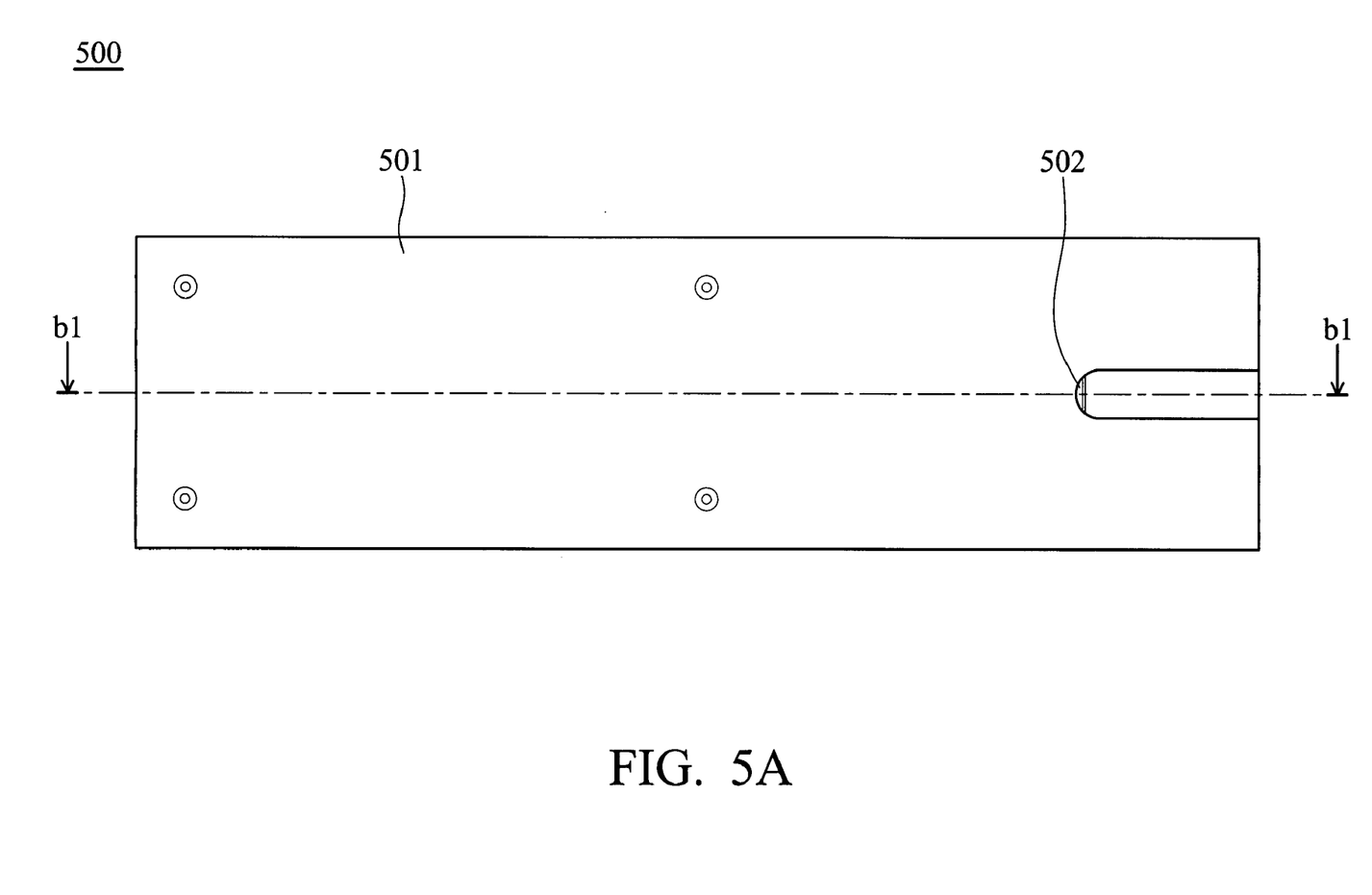
FIG. 5A is a top view of an optical transceiver module of the third embodiment of the invention.
Figure 5B:
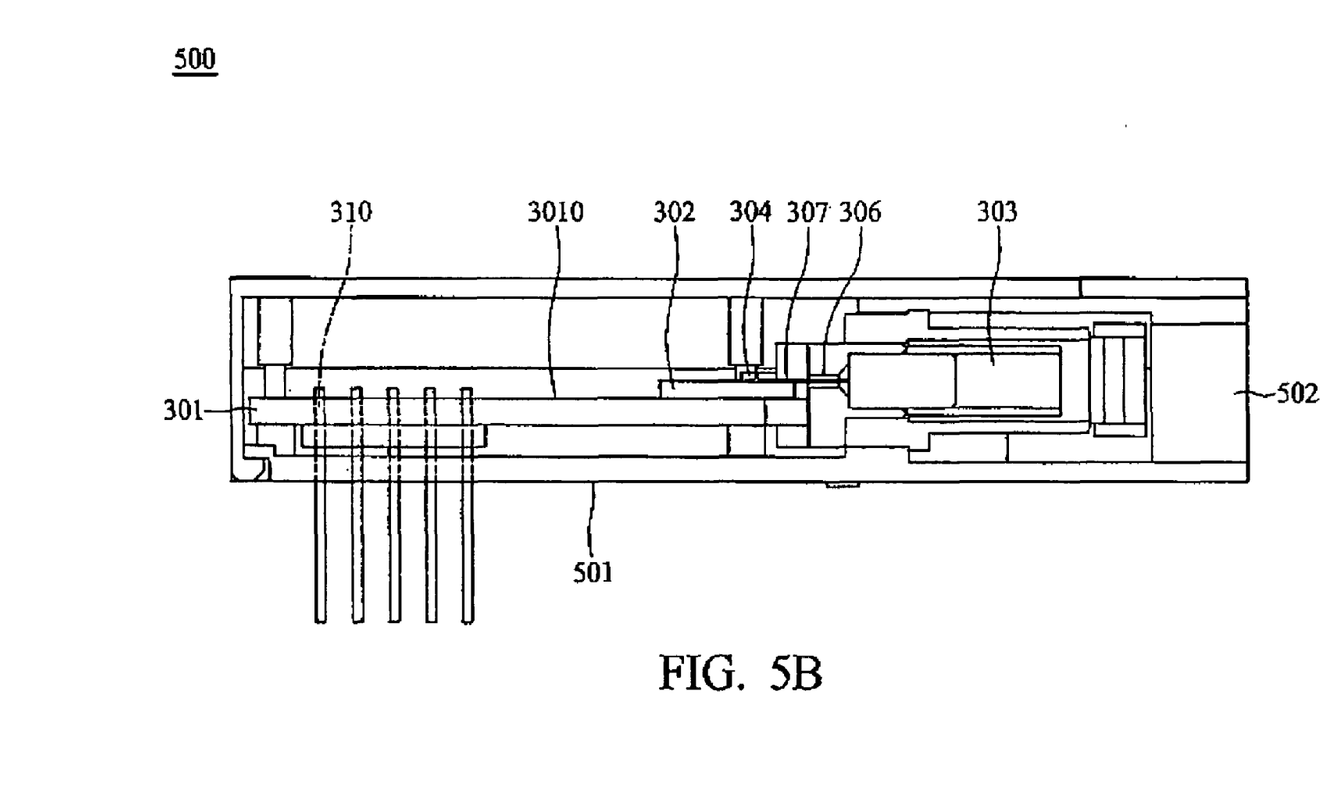
FIG. 5B is a schematic sectional view of the optical transceiver module along line (b1—b1) of FIG. 5A.

FIGS. 5A and 5B show an optical transceiver module 500 of the third embodiment of the invention. The optical transceiver module 500 differs from the optical transceiver module 300 in FIGS. 3A and 3B in that a housing 501 is further provided as a shield for the optical transceiver module 500. The housing 501 includes an opening 502 in the optical fiber 306, for outputting the optical signal from the core 307.

The housing 501 is fixed securely to the circuit structure 301 by adhesion, engaging, clamping, fitting, embedding, stuffing or using at least one pin 310. The optical fiber 306 is connected to the housing 501 by adhesive material, resilient material, stuffing material, flexible material or soft material. The housing 501 preferably has a cylindrical, pillar, polygonal or rectangular shape with an engaging portion.

Note that the optical transceiver of the invention is directly connected to the circuit structure instead of using the ceramic plate to connect to the circuit board of the related art, to reduce manufacturing cost and time.

Additionally, instead of using thermal bonding to connect the optical fiber to the optical transceiver and using the high-temperature ring to position the optical fiber, the bonding material between the optical fiber and the optical transceiver of the invention do not require application of the high-temperature resistant material, to simplify the manufacturing process and reduce production costs.

Additionally, the optical transceiver and the cover of the invention can be assembled by UV glue, cold Epoxy resin or other cold resins under low-temperature atmosphere, to reduce production costs.

Additionally, the optical fiber of the optical transceiver module of the invention is enclosed by flexible or soft material, so as to absorb vibration and pressure on the optical fiber and prevent shifting, deformation and cracking of the optical fiber.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. An optical transceiver module for connecting to an external system to form an electrical connection, comprising:
    a circuit structure comprising at least one pin connected to the external system and an outer surface;
    a fixture, partially or completely covering an optical fiber, wherein optical signals are transmitted in the optical fiber;
    an optical transceiver, coupled to the fixture and connected to the circuit structure for receiving/transmitting the optical signal; and
    a cover disposed within the outer surface to connect one end of the optical fiber to the optical transceiver.

2. The optical transceiver module as claimed in claim 1, further comprising a cap covering the fixture so that the circuit structure is embedded in the fixture.

3. The optical transceiver module as claimed in claim 2, wherein the cap comprises plastics, metal, alloy, stainless steel or ceramics.

4. The optical transceiver module as claimed in claim 1, wherein the circuit structure is embedded in the fixture.

5. The optical transceiver module as claimed in claim 1, wherein the fixture comprises a recess connecting with the circuit structure.

6. The optical transceiver module as claimed in claim 5, wherein the circuit structure is connected to the recess by adhesive, resilient material, stuffing material, flexible material or soft material.

7. The optical transceiver module as claimed in claim 1, wherein the fixture and the optical fiber are assembled by adhesive, resilient material, stuffing material, flexible material or soft material.

8. The optical transceiver module as claimed in claim 1, wherein the optical transceiver and the cover are disposed on one side of the circuit structure, and the optical transceiver is set between the cover and the circuit structure.

9. The optical transceiver module as claimed in claim 1, wherein the fixture comprises plastics, metal, alloy or ceramics.

10. The optical transceiver module as claimed in claim 1, wherein the cover comprises plastics, metal, alloy, stainless steel or ceramics.

11. The optical transceiver module as claimed in claim 1, wherein the cover is connected to the optical transceiver by UV glue, Epoxy or resin.

12. The optical transceiver module as claimed in claim 1, wherein the cover connects the optical fiber with the optical transceiver by adhesion, dot welding or laser welding.

13. An optical transceiver module for connecting to an external system to form an electrical connection, comprising:
    a circuit structure comprising at least one pin connected to the external system and an outer surface;
    a fixture, partially or completely covering an optical fiber, wherein optical signals are transmitted in the optical fiber;
    an optical transceiver, coupled to the fixture and connected to the circuit structure for receiving/transmitting the optical signal;
    a housing, having an opening for allowing the optical signals passing therethrough; and
    a cover disposed within the outer surface to connect one end of the optical fiber to the optical transceiver.

14. The optical transceiver module as claimed in claim 13, further comprising a cap covering the fixture so that the circuit structure is embedded in the fixture.

15. The optical transceiver module as claimed in claim 13, wherein the circuit structure is embedded in the fixture.

16. The optical transceiver module as claimed in claim 13, wherein the fixture comprises a recess connecting with the circuit structure.

17. The optical transceiver module as claimed in claim 13, wherein the optical transceiver and the cover are disposed on one side of the circuit structure, and the optical transceiver is set between the cover and the circuit structure.

18. The optical transceiver module as claimed in claim 13, wherein the optical fiber transmits the optical signal by passing through the opening.

* * * * *